United States Patent
Schönert

(10) Patent No.: US 10,247,370 B2
(45) Date of Patent: Apr. 2, 2019

(54) OMNI-DIRECTIONAL AIRPORT-TAXIWAY LIGHT

(71) Applicant: Oliver Schönert, Arnsberg (DE)

(72) Inventor: Oliver Schönert, Arnsberg (DE)

(73) Assignee: INDUPERM A/S, Nykøbing Falster (DK)

( * ) Notice: Subject to any disclaimer, the term of this patent is extended or adjusted under 35 U.S.C. 154(b) by 29 days.

(21) Appl. No.: 15/344,872

(22) Filed: Nov. 7, 2016

(65) Prior Publication Data

US 2017/0074472 A1    Mar. 16, 2017

Related U.S. Application Data

(63) Continuation of application No. PCT/EP2015/060069, filed on May 7, 2015.

(30) Foreign Application Priority Data

May 7, 2014    (EP) ...................................... 14167329

(51) Int. Cl.
*F21S 8/02* (2006.01)
*B64F 1/00* (2006.01)
(Continued)

(52) U.S. Cl.
CPC .............. *F21S 8/022* (2013.01); *B64F 1/002* (2013.01); *F21V 5/04* (2013.01); *F21V 29/503* (2015.01);
(Continued)

(58) Field of Classification Search
CPC ...... F21S 8/022; F21W 2111/06; B64F 1/002; F21V 29/503; F21V 29/507; F21V 29/70; F21V 5/04; F21V 31/005
(Continued)

(56) References Cited

U.S. PATENT DOCUMENTS 5,556,189 A *  9/1996  Wallis ....................... B64F 1/20
                                                    362/153.1
6,168,294 B1 *  1/2001  Erni .......................... B64F 1/18
                                                    359/819
(Continued)

FOREIGN PATENT DOCUMENTS

FR    2 790 443    9/2000
FR    2 944 531    10/2010

OTHER PUBLICATIONS

International Search Report dated Jul. 28, 2015 for International Application No. PCT/EP2015/060069.

*Primary Examiner* — Anh T Mai
*Assistant Examiner* — Michael Chiang
(74) *Attorney, Agent, or Firm* — Yakov S. Sidorin; Quarles & Brady LLP

(57) ABSTRACT

An omni-directional airport taxiway light source comprising housing with a lower casing, an upper casing mounted to the lower casing, and an outer lens mounted to an opening of the upper casing. Upper casing provides a substantially flat upper surface. First sealing is mounted between the lower and upper casings. Second sealing is mounted between the upper casing and the outer lens. Light emitting diode is positioned in the housing below the outer lens so that light of the diode is emitted in the direction of the outer lens. Inner lens is located in the housing between the light emitting diode and the outer lens. A flat carrier for the light emitting diode is positioned in the housing and is mounted to the upper casing. The light emitting diode is mounted to the carrier.

19 Claims, 2 Drawing Sheets

(51) Int. Cl.

| | |
|---|---|
| *F21V 31/00* | (2006.01) |
| *F21V 5/04* | (2006.01) |
| *F21V 29/70* | (2015.01) |
| *F21V 29/503* | (2015.01) |
| *F21W 111/06* | (2006.01) |
| *F21V 29/507* | (2015.01) |
| *F21Y 115/10* | (2016.01) |

(52) U.S. Cl.
CPC ............ *F21V 29/70* (2015.01); *F21V 31/005* (2013.01); *F21V 29/507* (2015.01); *F21W 2111/06* (2013.01); *F21Y 2115/10* (2016.08)

(58) Field of Classification Search
USPC .............................................. 362/153, 153.1
See application file for complete search history.

(56) References Cited

U.S. PATENT DOCUMENTS

| | | | |
|---|---|---|---|
| 6,565,239 B2 | 5/2003 | Rizkin et al. | |
| 7,344,266 B2* | 3/2008 | Coman .................... | E01F 9/559 362/153 |
| 2002/0159265 A1* | 10/2002 | Rizkin ...................... | B64F 1/20 362/373 |
| 2003/0048634 A1* | 3/2003 | You ........................... | B64F 1/20 362/153.1 |
| 2003/0169602 A1* | 9/2003 | Rizkin .................... | F21V 5/046 362/559 |
| 2005/0111216 A1* | 5/2005 | Reinert, Sr. ............... | B64F 1/20 362/153.1 |
| 2014/0218900 A1* | 8/2014 | Adair ...................... | F21S 8/022 362/183 |

\* cited by examiner

OMNI-DIRECTIONAL AIRPORT-TAXIWAY LIGHT

CROSS-REFERENCE TO RELATED APPLICATIONS

This application is a continuation of pending International Application No. PCT/EP2015/060069 filed on May 7, 2015, which designates the United States and claims priority from the European Application No. 14167329.3 filed on May 7, 2014. The disclosure of each of these patent documents is incorporated by reference herein.

BACKGROUND

1. Field of the Invention

The invention relates to an omni-directional airport taxiway light comprising a housing with a lower casing, with an upper casing mounted to the lower casing, and with an outer lens mounted to an opening of the upper casing, wherein the upper casing provides a substantially flat upper surface and wherein a first sealing is mounted between the lower casing and the upper casing and a second sealing is mounted between the upper casing and the outer lens, comprising a light emitting diode positioned in the housing below the outer lens so that light of the light emitting diode is emitted in the direction of the outer lens, comprising a carrier for the light emitting diode positioned in the housing, and comprising an inner lens located in the housing between the light emitting diode and the outer lens.

2. Description of Relevant Art

An omni-directional airport taxiway light is known which was originally designed for conventional light sources such as halogen lamps. In order to allow a light emitting diode to be used as a light source and to increase the energy efficiency of the omni-directional airport taxiway light it is redesigned so that a carrier for the light emitting diode is integrated in the existing housing of the omni-directional airport taxiway light. In order to position the light emitting diode below an outer lens of the omni-directional airport taxiway light the light emitting diode is mounted to a LED-board in a first step. The LED-board is then mounted to the carrier. An inner lens is allocated to the light emitting diode and positioned between the outer lens of the omni-directional airport taxiway light and the light emitting diode. The inner lens is an annular lens. The carrier for the light emitting diode has a complex, three-dimensional shape as is has to carry the LED-board with the light emitting diode and it has to fit into the existing housing of the omni-directional airport taxiway light which was originally designed for conventional light sources. Moreover, the heat management is unfavorable as heat of the light emitting diode is transferred to the LED-board, the carrier and the housing before it is dissipated.

U.S. Pat. No. 5,556,189 relates to an omni-directional taxiway light with a housing having an upper casing and a lower casing. A tungsten filament lamp is mounted in the housing and held in position by a lamp holder being bolted to the upper casing. The light being provided by the tungsten filament lamp passes a dichroic filter and a pair of axially symmetric conjugate lenses being positioned in a through hole of the upper casing. A first lens is mounted from below against a shoulder of the upper casing and fixed with epoxy resin in its position. The second lens is inserted from the top into the through hole and resides on a second shoulder facing upwards. A flush retaining ring is bolted from the top to the upper casing to fix the second lens in its position.

FR 2790443 relates to an airport light with an upper casing having elongated slits defining light output channels with a channel axis being inclined against the vertical and the horizontal. Each of these slits receives a prism support holding a prism with a light input face and a light output face, enabling light being coupled into the prisms from below to exit the housing via the respective channel. A LED-array is placed in front of the light input face. The optical axis of the LED-array is aligned with the respective channel axis and perpendicular to the respective light input face. The light output faces of the prism are protected against mechanical loads as exerted e.g. by wheels rolling over the airport light by protrusions of the upper casing and the prism supports.

SUMMARY

The problem to be solved is to provide an omni-directional airport taxiway light with a light emitting diode as a light source which is simple to produce and which provides good optical and thermal properties.

The inventive omni-directional airport taxiway light comprises an LED as light source being disposed inside a housing on a flat carrier. The flat carrier is mounted to an upper casing of the housing. The flat carrier is easy to produce and cheap. It can be designed as a two-dimensional carrier with a constant thickness, i.e. as plate, sheet or disc, preferably made of metal like e.g. Aluminum or stainless steel. Whereas three-dimensional carriers are produced by die casting or sand casting the flat carrier can be produced by cutting a blank sheet or the like. For example jet cutting and/or laser cutting can be used to produce the flat carrier from a metal sheet. As will be explained below in more detail, the carrier can easily be dimensioned to bear even large loads as being exerted by wheels rolling over the omni-directional airport taxiway light or of snowplows and the like. The corresponding thickness in addition enhances heat dissipation, i.e. cooling of the LED by simply conducting the heat from the LED to the housing. The surface of the housing is thus a heat sink.

In an embodiment, the heat dissipation is particularly enhanced if the light emitting diode is directly mounted to the carrier and the carrier is directly mounted to the upper casing. Directly mounting the light emitting diode may include in practice that a printed circuit board (PCB) or a mounting pad supporting the light emitting diode is mounted directly to the carrier, providing a (preferably direct) thermal contact between the PCB and the carrier. The heat of the light emitting diode can thus be directly transferred to the carrier. It is then transferred to the upper casing from the carrier and dissipated from the upper casing. The carrier as well as the upper casing can be made of solid material in order to further improve heat dissipation. For example the upper casing and or the carrier can be made of metal. The heat provided by the LED in practice may even be sufficient to deice the omni-directional airport taxiway light, e.g. in case it is covered with snow.

In an embodiment, the upper casing may comprise a through hole with a diameter that increases downwards. A first transparent cover may be inserted from below into the through hole, until it reaches a stop being provided by the boundary of the through hole. The stop may e.g. be provided by a shoulder of the upper casing which may come into contact with a complementary shoulder (or overhang) of the transparent cover. Of course a sealing may be positioned in between of the two matching shoulders. The transparent cover is in practice preferably a lens for directing the light as required, e.g. an axially symmetric lens. This transparent cover may be held in position by the cover being mounted as well from below against the upper casing. In other words, the cover may reside on the carrier and not on the upper casing. Preferably, a sealing element is positioned between the carrier and the transparent cover. This construction enables to support the cover (the second lens) with a large surface on the carrier. Thus, when a load is exerted form the top to the cover (e.g. by a plane's landing gear), there is almost no shear stress to the be absorbed by the cover and typical transparent cover materials like glass and the like can easily absorb large amounts of compressive stress.

As already apparent from the above, the carrier may be mounted, e.g. bolted, against a shoulder surrounding the through hole and thus being provided by the upper casing. A lens may be positioned on the carrier (or a PCB on top of the carrier), i.e. between the light emitting diode and the cover. Considering this lens as first (inner) lens and the cover as second (outer) lens, the two lenses may form a pair of axially symmetric conjugate lenses.

In a further embodiment of the invention an inner surface of the inner lens and/or an inner surface of the outer lens provide an optical structure which is designed for redirection a good portion of the light of the light emitting diode to an angular range of 0° to 10° with respect to a plane defined by the substantially flat upper surface of the upper casing. According to the invention at least 50 percent of the light emitted by the light emitting diode is redirected to the angular range of 0° to 10°. Even more preferred 80 percent of more of the light of the light emitting diode are redirected to the angular range of 0° to 10°. The inner surface of the inner lens and/or the inner surface of the outer lens can be designed as a beveled inner surface. Moreover, the inner surfaces of the lenses can be designed as free-formed surfaces.

According to further embodiment of the invention the carrier provides a disc shape and an annular contact area is built between the carrier and the upper casing. The disc shape of the carrier simplifies the production of the carrier as well as the assembly of the omni-directional airport taxiway light. The annular contact area further improves heat dissipation as heat can be dissipated in all directions.

In a further embodiment of the invention the upper casing provides another border or boundary of the opening corresponding to the through hole, on a lower, inner side of the upper casing. Such boundary may be configured to define a recess of the through hole. The flat carrier with the light emitting diode is positioned within the opening. The opening allows for a compact design and excellent optical features as the light source can be positioned next to the lenses of the omni-directional airport taxiway light.

BRIEF DESCRIPTION OF THE DRAWINGS

In the following, the invention will be described by way of example, without limitation of the general inventive concept, on examples of embodiment and with reference to the drawings.

Figure 1:
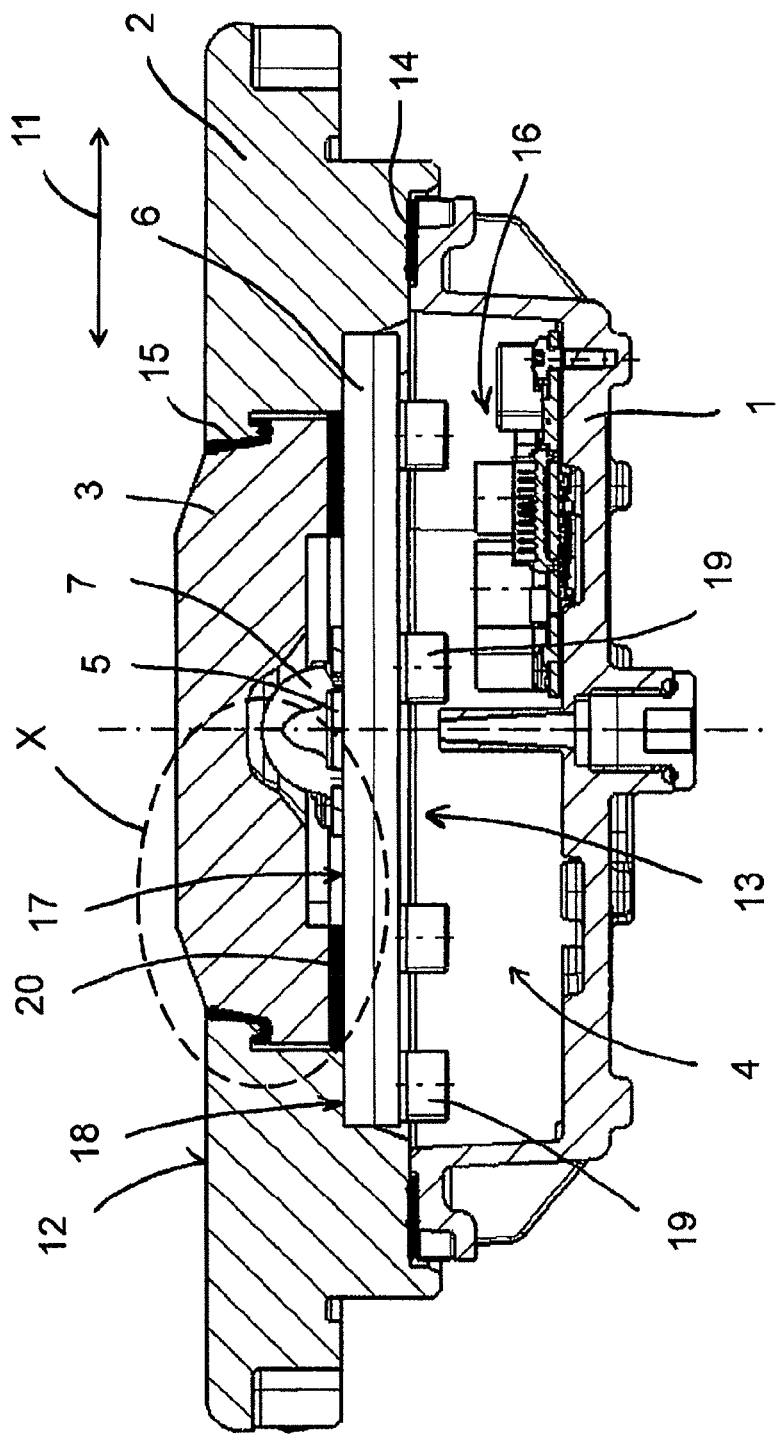
FIG. 1 shows a cross-sectional view of an omni-directional airport taxiway light and FIG. 2 shows detail X as indicated in FIG. 1.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

FIG. 1 shows an omni-directional airport taxiway light. The omni-directional airport taxiway light comprises a housing with a lower casing 1, an upper casing 2 mounted to the lower casing 1 and with an outer lens 3 mounted to an opening (i.e. a through hole) of the upper casing 2. The outer lens 3 is thus a transparent cover and can be of any suited material, e.g. glass. The diameter of the opening increases towards the lower casing (thus in the downward direction), while its shape provides steps and/or recesses. The steps provide down facing shoulders. One of these shoulders provides a block or stop or abutment structure for the outer lens against an upward movement of the outer lens. A second shoulder provides a stop for a carrier 6 being bolted from below against the upper casing 2.

A first sealing element 14 is mounted between the lower casing 1 and the upper casing 2 to tightly, sealingly connect those two together. A second sealing element 15 is mounted between the upper casing 2 and the outer lens 3 to tightly fasten those two together. The housing defines a sealed inner space 4 of the omni-directional airport taxiway light.

The omni-directional airport taxiway light further comprises a light emitting diode 5 as a light source, the carrier 6 for supporting the light source 5 and an inner lens 7. The light emitting diode 5 is directly mounted to the carrier 6 and positioned in the housing below the outer lens 3 so that light of the light emitting diode 5 is emitted in the direction of the outer lens 3. The outer lens is essentially flush with the top surface of the upper casing 2. The inner lens 7 is located between the light emitting diode 5 and the outer lens 3. The optical axes of the light emitting diode, the inner lens 7 and the outer lens 3 are aligned as indicated by the dash dotted line.

An electronics assembly 16, i.e. circuitry 16 for controlling the LED-current, is positioned in the sealed inner space 4. The electronics assembly 16 is mounted to the lower casing 1 and heat losses of the circuitry are thus dissipated essentially by the lower casing and not by the upper casing, thereby further enhancing cooling of the LED. The electronics assembly 16 can provide a sealing, e.g. it may be sealed e.g. by some potting.

Figure 2:
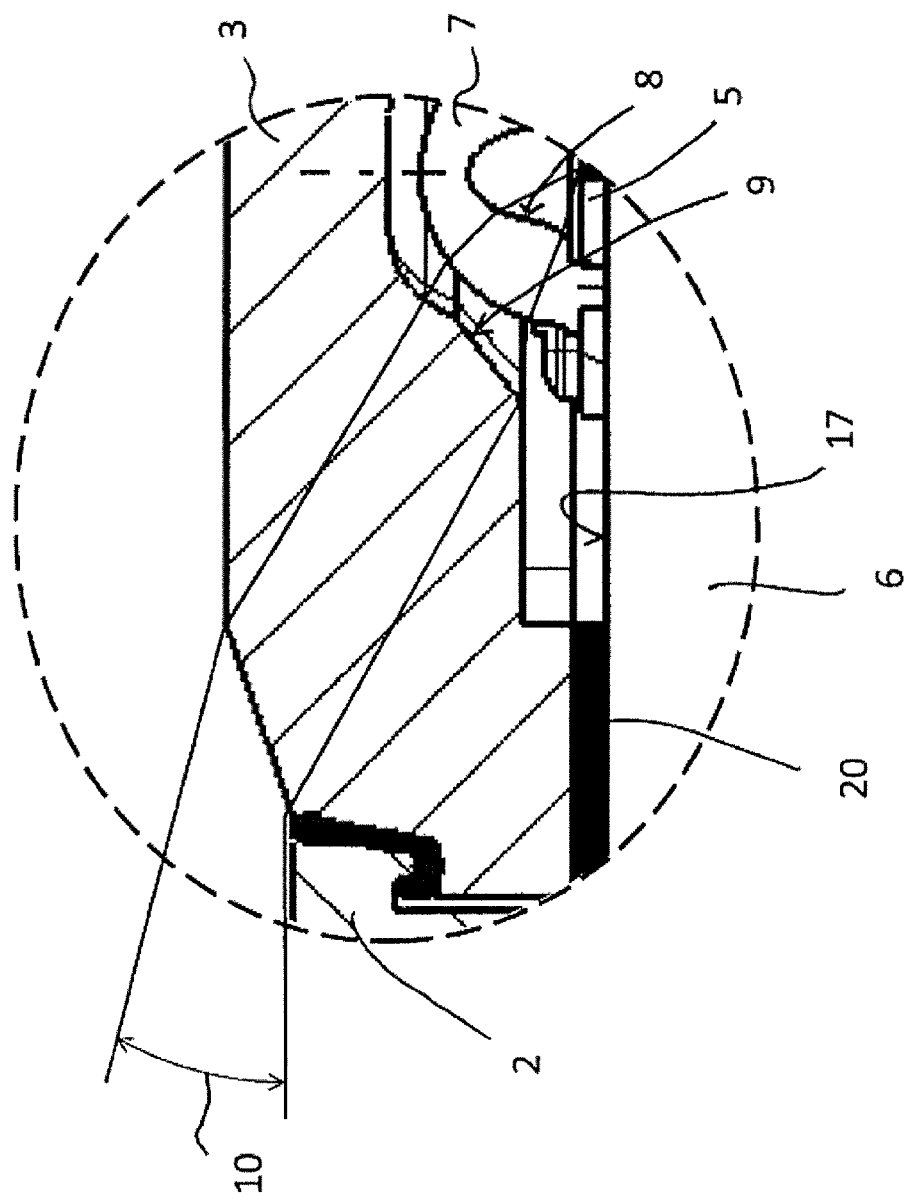

The flat carrier 6 supports the light emitting diode on a flat surface 17 (see FIG. 2) facing the lenses 3, 7. The flat carrier 6 is made of a sheet of metal and can be considered as a metal plate or a metal disc. It can be produced by jet cutting or laser beam cutting for example. E. g. the flat carrier 6 can be made of aluminum and provides good thermal properties such as heat conductivity. A plurality of screws 19 is provided to mount the flat carrier 6 to the upper casing 2. To this end the upper casing provides a downward facing shoulder surrounding the opening as a stop for the carrier 6. The carrier is clamped by the screws 19 against the downward facing shoulder. An annular contact area 18 is thus provided between the flat surface 17 of the carrier 6 and the upper casing 2 enabling an enhanced heat transfer between the light emitting diode 5 via the carrier 6 to the upper casing 2. From the upper casing 2 the heat is dissipated.

A ring-shaped plate 20 is located between the outer lens 3 and the carrier 6. The plate 20 supports the outer lens 3 on the carrier 6 and defines a vertical distance between the light emitting diode 4 and the outer lens 3.

An additional plate is located as spacer between the plate 20 and the outer lens 3 and the inner lens 7. The additional plate enables to center the inner lens 7 relative to the outer lens 3.

Both the inner lens 7 and the outer lens 3 cover the light emitting diode 5. Light emitted by the light emitting diode 5 passes through both lenses 3, 7. The inner lens 7 has a dome shape and provides a concave inner surface 8 (that faces away from the outer lens 3). Light from the diode 5 is outcoupled through the lenses 3 and 7 outwardly through at least a portion of the outermost surface of the lens 3. In one specific embodiment, the inner surface 9 of the outer lens 3 (that faces the inner lens) provides an optical structure which is designed for redirecting a substantial portion (defined as at least 80 percent) of the light of the light emitting diode 5 to an angular range 10 of 0° to 10° with respect to a plane 11 defined by a substantially flat upper surface 12 of the upper casing 2. In this specific case, the light output from the embodiment is perceived, in a cross-section transverse to the axis (shown with a dot-dashed line A in FIG. 1), as a ring or annulus of light or at least an arcuate portion or segment of a ring of light defined by such angular distribution at the peripheral portion of the outermost surface of the lens 3. (The remaining portion of the light output from the diode 5 may be emitted through at least a portion of the flatter, central portion of the outermost surface of the outer lens 3 that is circumscribed by the peripheral portion). In an embodiment in which the light transmission of the outermost surface of the lens 3 is appropriately reduced or blocked, the light output may be formed spatially-asymmetrically in that either of the ring, peripheral portion of the output (emanating within the preferred angular range identified above) and the spatially-central portion of the output (emanating through the flatter central section of the outermost surface of the lens 3) appear spatially incomplete. For example, in related embodiments, the overall light output is dimensioned as a ring or annulus fully surrounding substantially dark(er) central area or as an arcuate band of light bent around a substantially dark(er) area. The upper surface 12 provides the opening for mounting of the lens 3.

The lower portion 13 of the opening in a lower surface of the upper casing 2 is structured as a recess or step. The flat carrier 6 is positioned within and/or abutted against the portion 13. The light emitting diode 5 is mounted to the flat surface 17 of the carrier 6 and located next to the lenses 3, 7. Heat of the light emitting diode 5 is transferred to the upper casing 2 via the carrier 6 and dissipated from the upper casing 2.

Above we used the terms upwards and downward to indicate the relative positions of pieces. These terms are to be understood that the surface 12 of the upper casing faces upwards. Its diametrically opposed surface, which provides a block for the lower casing is in turn facing downwards. Thus, the term upwards and downwards refer to the orientation of the light under assumed normal mounting conditions, regardless of its real orientation in space. For example, during the mounting process it may be advantageous to flip the upper casing 2 such that its surface 12 faces towards the earth, but of course it remains the top surface.

It will be appreciated to those skilled in the art having the benefit of this disclosure that this invention is believed to provide an omni-directional airport taxiway light. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 1 lower casing
2 upper casing
3 outer lens
4 sealed inner space
5 light emitting diode (LED)
6 carrier
7 inner lens
8 inner surface
9 inner surface
10 range
11 plate
12 upper surface
13 opening
14 sealing
15 sealing
16 electronics assembly
17 surface
18 contact area
19 screw
20 plate

The invention claimed is:

1. An omni-directional airport taxiway light device comprising:
    a housing with a lower casing, with an upper casing configured to be mounted to the lower casing, and with an outer lens being mounted to an opening of the upper casing, wherein the upper casing provides a substantially flat upper surface and wherein a first sealing element is disposed between the lower casing and the upper casing and a second sealing element is disposed between the upper casing and the outer lens to form an inner space of the airport taxiway light device that is sealed from a medium surrounding the airport taxiway light device;
    a light emitting diode positioned in the housing below the outer lens and configured to emit light in a direction towards the outer lens;
    a carrier supporting the light emitting diode, the carrier being positioned in the housing;
    an inner lens located in the housing between the light emitting diode and the outer lens;
    wherein the carrier is a flat carrier and is mounted to the upper casing and
    wherein the light emitting diode is mounted to the flat carrier,
    wherein at least one of an inner surface of the inner lens and an inner surface of the outer lens contains an optical structure configured to redirect at least 80 percent of the light, emitted by the light emitting diode, to within an angular range of 0° to 10° with respect to a plane that is defined by the substantially flat upper surface of the upper casing.

2. The omni-directional airport taxiway light device of claim 1, wherein the carrier is a disc-shaped carrier.

3. The omni-directional airport taxiway light device of claim 1, wherein an annular contact area is provided between the carrier and the upper casing.

4. The omni-directional airport taxiway light device of claim 1, wherein the opening of the upper casing provides a recess on a lower side thereof and wherein the carrier with the light emitting diode is positioned within the recess.

5. The omni-directional airport taxiway light device of claim 1, wherein the inner lens has a domed shape.

6. The omni-directional airport taxiway light device of claim 1, wherein the opening has a diameter and this diameter increases towards the carrier.

7. The omni-directional airport taxiway light device of claim 6, wherein the opening is surrounded by at least a first shoulder of the upper casing facing towards the lower casing and wherein the first shoulder provides an abutment structure for the outer lens.

8. The omni-directional airport taxiway light device of claim 6, wherein at least a section of the opening is surrounded by a tapered boundary of the upper casing, said tapered boundary dimensioned to center a position of the outer lens in the opening.

9. The omni-directional airport taxiway light device of claim 6, wherein the opening is surrounded by at least a second shoulder of the upper casing facing towards the lower casing and wherein the second shoulder provides a block against which the carrier is clamped.

10. The omni-directional airport taxiway light device of claim 1, wherein the outer lens is positioned in the opening and clamped by the carrier against a block being provided by the upper casing.

11. An omni-directional airport taxiway light device comprising:
- a housing with a lower casing and an upper casing, wherein the upper casing is configured to be mounted to the lower casing, wherein the upper casing has a substantially flat upper surface and a through opening dimensioned to form a first shoulder in the upper casing, said first shoulder facing the lower casing;
- an outer lens dimensioned to form a second shoulder in the outer lens and an annular surface, the second shoulder having a shape that is complementary to a shape of the first shoulder, wherein the outer lens is affixed in said opening with the second shoulder abutted against the first shoulder and the annular surface facing away from the substantially flat upper surface of the upper casing;
- wherein a first sealing element is disposed between the lower casing and the upper casing and a second sealing element is disposed between the upper casing and the outer lens to form an inner space of the airport taxiway light device, the inner space being sealed from a medium surrounding the airport taxiway light device;
- a light emitting diode positioned in the housing under the outer lens and configured to emit light in a direction towards the outer lens;
- an inner lens located in the housing between the light emitting diode and the outer lens;
- a carrier having a flat surface and mounted to the upper casing in the inner space with the flat surface facing the inner lens and the outer lens
  - to support the inner lens and the light-emitting diode on the flat surface, and
  - to affix the outer lens against the first shoulder from the inner space, and
- a ring-shaped plate disposed between the annular surface of the outer lens and the flat surface of the carrier to define a distance between the light-emitting diode and the outer lens.

12. The omni-directional airport taxiway light device of claim 11, wherein at least one of an inner surface of the inner lens and an inner surface of the outer lens contains an optical structure configured to redirect at least 80 percent of the light, emitted by the light emitting diode, to within an angular range of 0° to 10° with respect to a plane that is defined by the substantially flat upper surface of the upper casing.

13. The omni-directional airport taxiway light device of claim 11, wherein the carrier is a disc-shaped carrier.

14. The omni-directional airport taxiway light device of claim 11, wherein the carrier and the upper casing are in contact within one another at an annular contact area.

15. The omni-directional airport taxiway light device of claim 11, wherein the through opening of the upper casing provides a recess on a lower side thereof and wherein the carrier with the light emitting diode is positioned within the recess.

16. The omni-directional airport taxiway light device of claim 11, wherein the inner lens has a domed shape.

17. The omni-directional airport taxiway light device of claim 11, wherein the through opening has a diameter that increases in a direction towards the carrier.

18. The omni-directional airport taxiway light device of claim 17, wherein at least a section of the through opening is surrounded by a tapered boundary of the upper casing, said tapered boundary dimensioned to center a position of the outer lens in the opening.

19. The omni-directional airport taxiway light device of claim 17, wherein the through opening is dimensioned to form a third shoulder of the upper casing, the third shoulder facing towards the lower casing, wherein the third shoulder provides a block against which the carrier is clamped.

* * * * *